United States Patent
Kirsch et al.

(10) Patent No.: US 9,830,047 B2
(45) Date of Patent: Nov. 28, 2017

(54) SYSTEM AND METHOD FOR IMPROVED DISPLAY OF MEDIA ASSETS IN A LAYOUT

(71) Applicant: Apple Inc., Cupertino, CA (US)

(72) Inventors: Brian E. Kirsch, Cupertino, CA (US); Charles E. Edwall, Cupertino, CA (US); Christopher J. Shull, Cupertino, CA (US)

(73) Assignee: APPLE, Cupertino, CA (US)

( * ) Notice: Subject to any disclaimer, the term of this patent is extended or adjusted under 35 U.S.C. 154(b) by 358 days.

(21) Appl. No.: 14/656,048

(22) Filed: Mar. 12, 2015

(65) Prior Publication Data

US 2016/0266736 A1    Sep. 15, 2016

(51) Int. Cl.
*G06F 3/0482* (2013.01)
*G06F 3/0485* (2013.01)
*G06F 17/30* (2006.01)
*H04L 29/06* (2006.01)

(52) U.S. Cl.
CPC .......... *G06F 3/0482* (2013.01); *G06F 3/0485* (2013.01); *G06F 17/30244* (2013.01); *H04L 65/4069* (2013.01)

(58) Field of Classification Search
CPC .............................. G06F 3/0482; G06F 3/0485
See application file for complete search history.

(56) References Cited

U.S. PATENT DOCUMENTS

| | | | | |
|---|---|---|---|---|
| 2005/0192838 A1* | 9/2005 | Jones | .................... | G06F 19/322 705/2 |
| 2005/0235209 A1* | 10/2005 | Morita | .................. | G06F 3/0482 715/716 |
| 2008/0256439 A1* | 10/2008 | Boreham | .............. | G06F 17/211 715/246 |
| 2009/0164880 A1* | 6/2009 | Lection | .................. | G06F 3/0481 715/212 |
| 2010/0325529 A1* | 12/2010 | Sun | .................... | G06F 17/30905 715/234 |
| 2011/0173531 A1* | 7/2011 | Hitaka | ..................... | G06F 17/24 715/255 |
| 2013/0322535 A1* | 12/2013 | Lim | .................. | H04N 19/00575 375/240.15 |
| 2014/0006951 A1* | 1/2014 | Hunter | .................... | H04H 60/31 715/719 |
| 2015/0160801 A1* | 6/2015 | Holt | ....................... | G06F 3/0482 715/784 |
| 2016/0004669 A1* | 1/2016 | Hunter | .............. | G06F 17/30259 715/243 |
| 2016/0266736 A1* | 9/2016 | Kirsch | .................. | G06F 3/0482 |

* cited by examiner

*Primary Examiner* — David Choi
(74) *Attorney, Agent, or Firm* — DLA PIPER LLP US

(57) ABSTRACT

Asset data streams are provided that facilitate the display of large numbers of media assets. Encoded asset data streams provide approximated aspect ratio information for media assets to be used in determining a position for each media asset in a dataset, thus being able to position all of the media assets in a media asset arrangement prior to being scrolled into view by the user. By communicating aspect ratio approximations as part of an encoded asset data stream of data to a web application, a user is able to scroll to any part of a dataset (e.g., a photo library) when presented in the web application without having to wait on the receipt of information for all media assets. Encoded asset data streams may further include asset identification offsets that indicate a sequential ordering of the individual assets in a dataset.

20 Claims, 7 Drawing Sheets

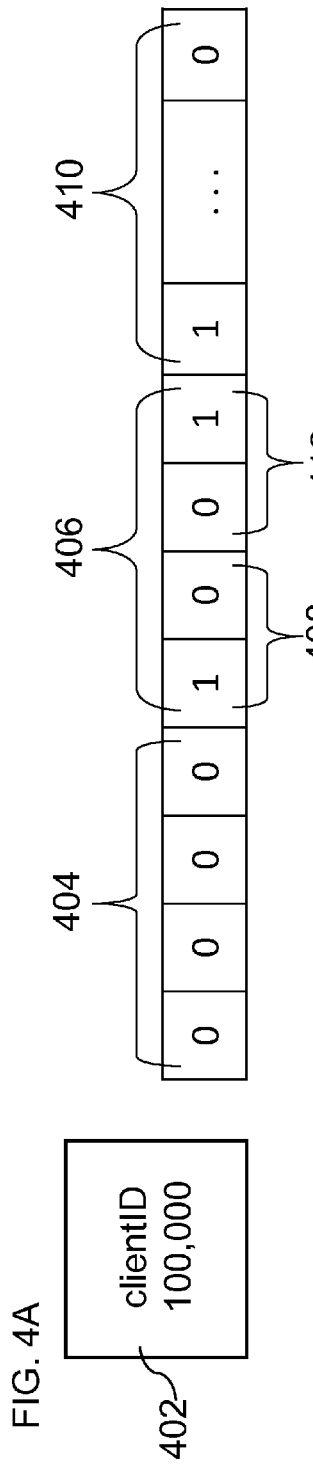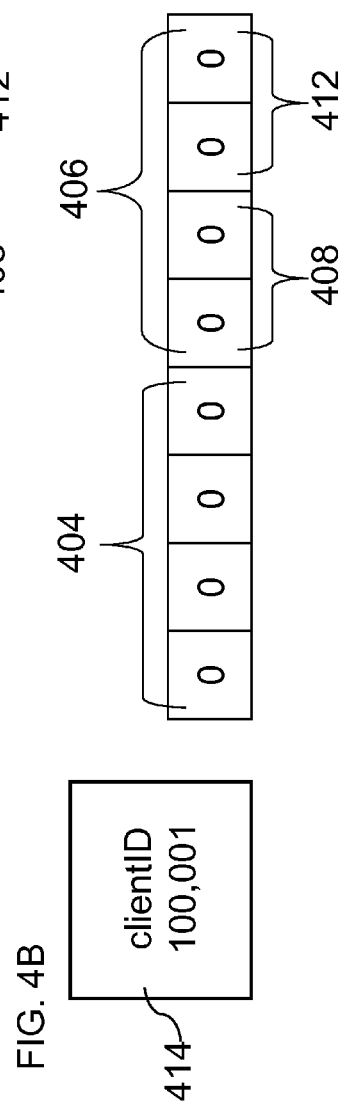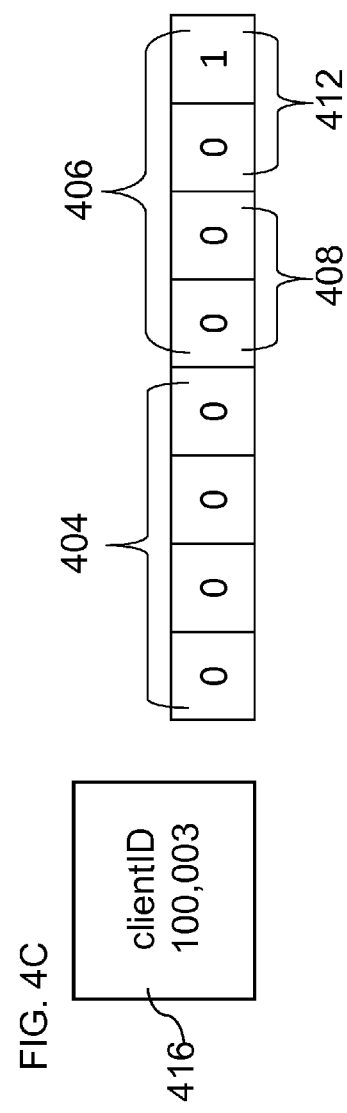

SYSTEM AND METHOD FOR IMPROVED DISPLAY OF MEDIA ASSETS IN A LAYOUT

OVERVIEW

Fast access to scrollable content in datasets provides a smoother scrolling experience by providing the ability to scroll through datasets without interruption. Local applications, such as desktop photo library managers, have an advantage over web applications in that the native applications generally have faster access to all of the information needed to position content items that a user could scroll into view. Native applications accomplish this by having fast access to all local information that can be displayed, as the information is commonly available locally on a computer's memory or mass storage. That information can be used to determine a position for each content item in a dataset, thus the native application is able to position or arrange all of the content items prior to being scrolled into view by the user.

By knowing a position for each content item in a dataset, it is possible to determine the height of the entirety of scrollable content, as well as which content items will be shown at any location within the dataset when scrollable content is brought into view by the user. The determination of content item positions can be problematic for arrangements in which the positions or sizes of displayed content items depend on the positions or sizes of content items that come before them, as the position of any content item requires knowledge of all previous items. Web applications often receive that information for positioning content items over a network, which can often be slower relative to the speed of information access offered by local desktop applications.

FIG. 1 illustrates an example graphical user interface that appears on a screen of a client device for presenting photos. The display screen 102, which can be a liquid crystal display (LCD) or other display device, displays a user interface 100 that presents a plurality of photos 104-122. However, depending on the dimensions of the photos, the display screen 102, and the user interface 100, only a limited number of photos can be presented on the display screen 102 at the same time. With large sets of photos (e.g., photo libraries), the displayed photos 104-122 represent only a portion of all photos. Additional photos can be displayed by scrolling the additional photos into view on the display screen 102.

As the user scrolls through the photos, the photos are re-positioned as at least a portion of previously displayed photos are removed from display and previously undisplayed photos are presented on the display screen 102. Native applications, such as desktop photo library managers, have an advantage over web applications in that the native applications generally have faster access to all of the information needed to position photos that a user could scroll into view. Native applications accomplish this by having fast access to everything that can be displayed, as the information is commonly available locally on a computer's memory or mass storage. That information can be used to determine a position for each photo in a dataset, thus the local application is able to position all of the photos prior to the photos being scrolled into view by the user.

In contrast, web applications (e.g., web products or services, such as FACEBOOK, FLICKR, TWITTER, or other services that handle large quantities of media assets) often require information regarding the photos be transmitted over a network from a server to a client device at which the user can view the photos. However, access to that information is often slower relative to the information access rate offered by native desktop applications due to, for example, network bandwidth limitations. Thus, web applications often only receive that information incrementally, loading and displaying the photos as the data is received. As a web application receives photo information, the photos associated with the received information are displayed (e.g., such as the photos 104-122 illustrated in FIG. 1). As the user scrolls through the photos and the display is scrolled near an end of the received information on the display screen 102, additional photos are loaded for display. Because the additional photos are loaded for display only after the user scrolls towards the end of currently available data, a scroll-and-wait user experience often results as the user attempts to navigate through the photos. Inefficiencies arise if the user needs to locate a photo positioned towards an end of a dataset. For example, photos that are not located close to currently displayed photos, such as old photos or posts, can only be displayed after the user engages in multiple scroll-and-wait scroll routines.

Enabling the ability to scroll without interruption through an entire dataset would require providing a web application the information required to position each item of the dataset (e.g., the media assets) within a media asset arrangement prior to display of the photos. By knowing a position for each photo in a dataset, it is possible to determine which photos will be shown when scrollable content at any location within the dataset is brought into view by the user.

BRIEF DESCRIPTION OF THE DRAWINGS

The drawings illustrate generally, by way of example, but not by way of limitation various embodiments discussed in the present document.

FIGS. 4A-C provide bit sequence examples of custom payload encoding for media assets.

DETAILED DESCRIPTION

Figure 1:
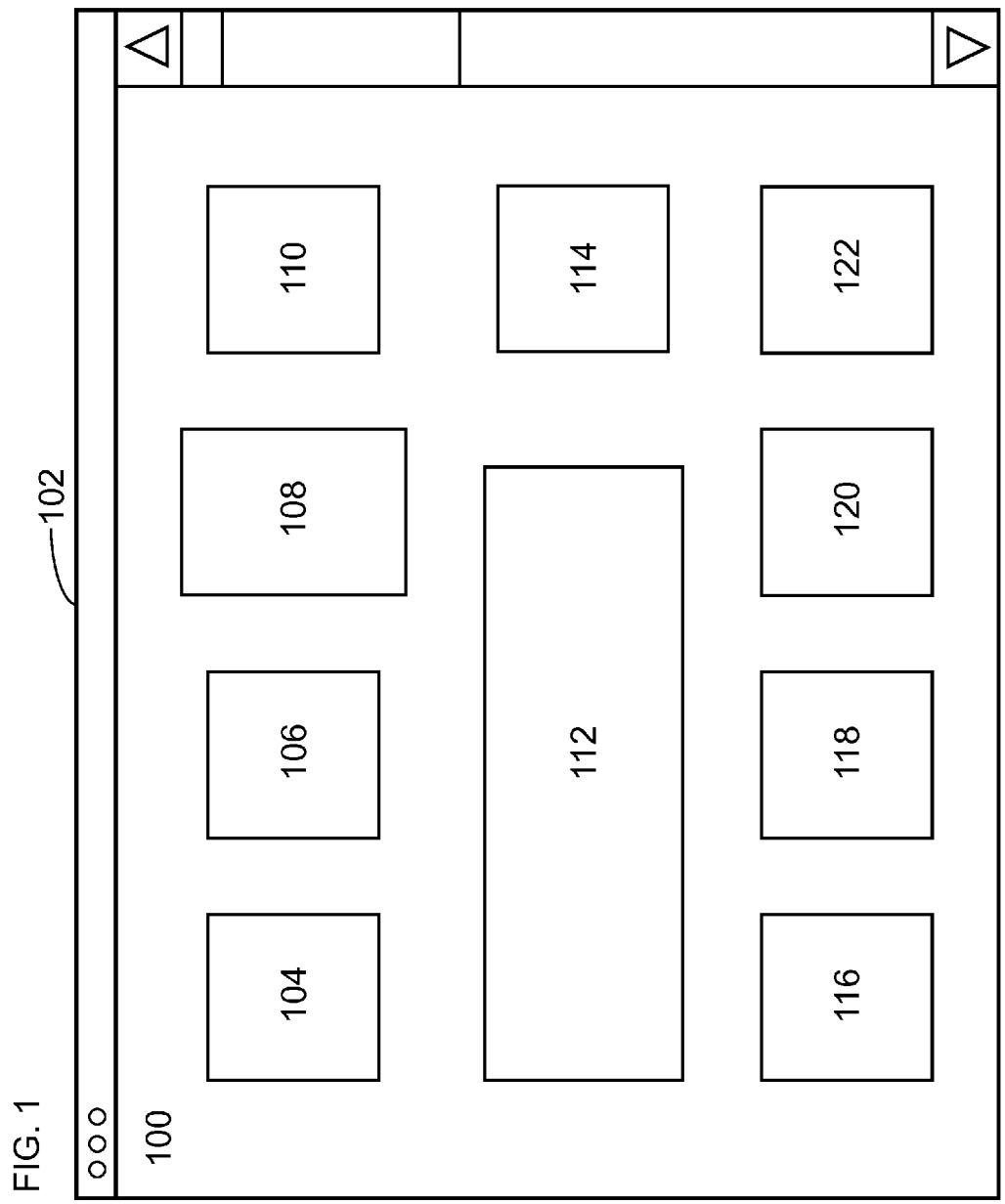
FIG. 1 illustrates an example graphical user interface that appears on a screen of a client device for presenting media assets.

The following detailed description refers to the accompanying drawings that depict various details of examples selected to show how particular embodiments may be implemented. The discussion herein addresses various examples of the inventive subject matter at least partially in reference to these drawings and describes the depicted embodiments in sufficient detail to enable those skilled in the art to practice the invention. Many other embodiments may be utilized for practicing the inventive subject matter than the illustrative examples discussed herein, and many structural and operational changes in addition to the alternatives specifically discussed herein may be made without departing from the scope of the inventive subject matter.

In this description, references to "one embodiment" or "an embodiment," or to "one example" or "an example" mean that the feature being referred to is, or may be, included in at least one embodiment or example of the invention. Separate references to "an embodiment" or "one embodiment" or to "one example" or "an example" in this description are not intended to necessarily refer to the same embodiment or example; however, neither are such embodiments mutually exclusive, unless so stated or as will be readily apparent to those of ordinary skill in the art having the benefit of this disclosure. Thus, the present disclosure includes a variety of combinations and/or integrations of the embodiments and examples described herein, as well as further embodiments and examples as defined within the scope of all claims based on this disclosure, as well as all legal equivalents of such claims.

The processes depicted in the figures that follow can be performed by processing logic that comprises hardware (e.g., circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Media Asset Arrangement

Consider a hypothetical photo library containing one-hundred thousand photos. Common methods of encoding data (e.g., the photo aspect ratios) for transmittal between a server and a client device (e.g., a computer or mobile device on which the web application is used to navigate the photo library) includes encoding and transmitting the aspect ratio information as a string of characters, such as in the form of JavaScript Object Notation (JSON) or Extensible Markup Language (XML). A number encoded in plain text as a string of characters is represented by a series of digits, with each character representing a digit of the encoded number. Given that only 10 of 256 unique values representable by a byte of data (e.g., in Unicode UTF-8 for any ASCII character) corresponds to numerical digits, encoding and transmitting numbers as a string a characters is inefficient. For the purposes of this document, a byte is defined as an 8-bit value. Each byte-sized character encoding would only represent a single digit of a number. Thus, eight significant figures of precision for each aspect ratio of a photo, plus a decimal point, would need approximately 900 kilobytes (KB) of data to represent the aspect ratios for the photo library containing one-hundred thousand photos. In contrast, a binary format of encoding would be more data efficient. For example, a 32-bit value can be used to be used to represent aspect ratios. Such an encoding scheme would require four bytes per photo, or in other words, approximately 400 KB for the photo library containing one-hundred thousand photos. Further data efficiency can be accomplished if less data-intensive methods are used. For example, approximated aspect ratio values can be assigned to photos and transmitted from a server to a client device.

According to various embodiments, encoded asset data streams are provided that facilitate the display of large numbers of media assets. Media assets can include image files, video files, audio files, social media posts (e.g., Twitter Tweets or Facebook posts), documents, or any other digital file. The determination of media asset positions can be problematic for media asset arrangements in which the positions or sizes of displayed media assets depend on the positions or sizes of media assets that come before them, as the position of any media asset requires knowledge of all previous items. Encoded asset data streams include approximated aspect ratio information of media assets to be used in determining a position for each media asset in a dataset, thus all of the media assets in a media asset arrangement can be positioned prior to being scrolled into view by the user. By including aspect ratio approximations in encoded asset data streams, the user is able to scroll to any part of a dataset (e.g., a photo library) when navigating through the dataset in a web application.

Figure 2:
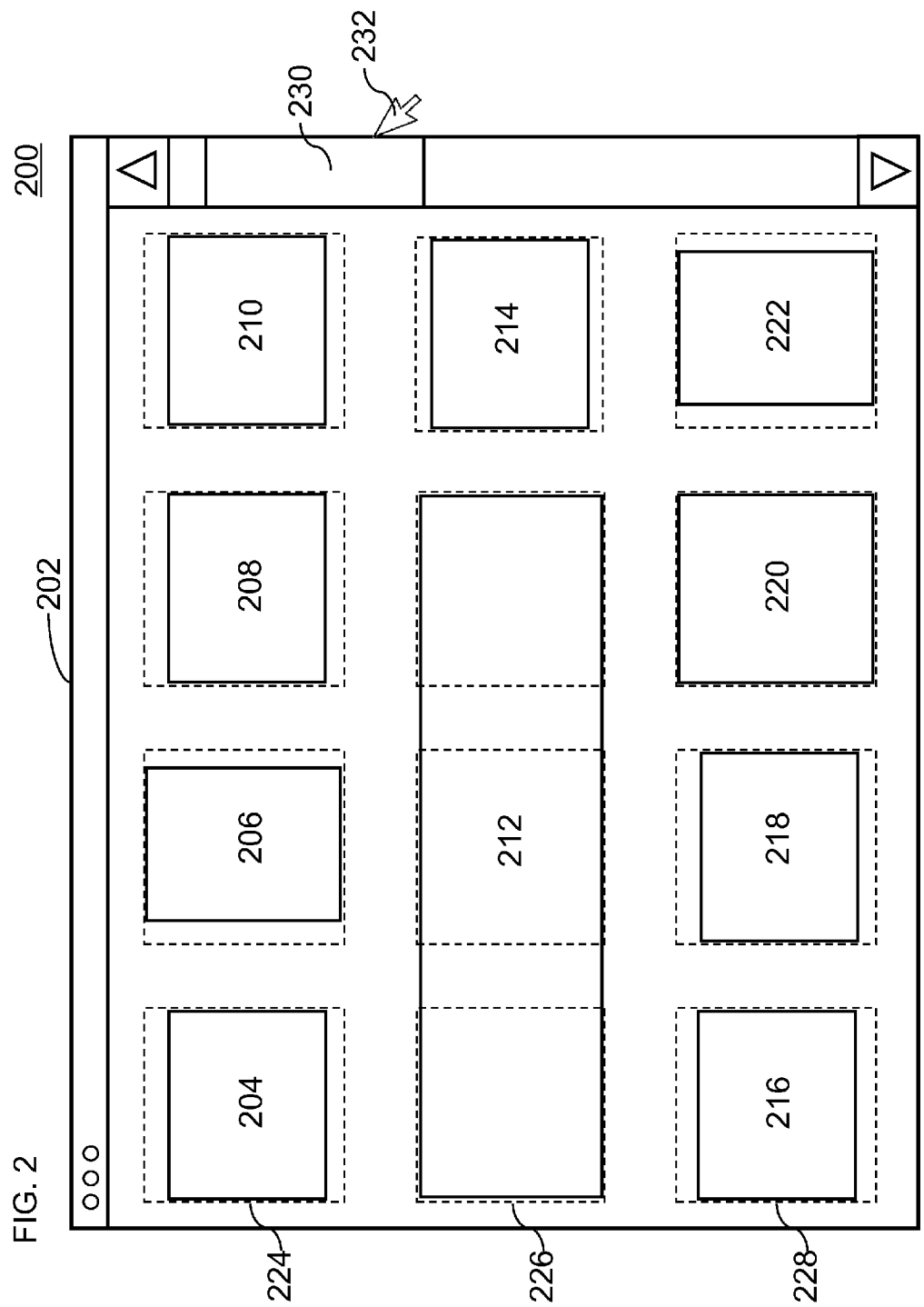
FIG. 2 illustrates an example graphical user interface that appears on a screen of a client device for presenting media assets using one embodiment of a media asset arrangement and approximated aspect ratios.

FIG. 2 illustrates an example graphical user interface that appears on a screen of a client device for presenting media assets using one example of a media asset arrangement 200 and approximated aspect ratios. Approximated aspect ratios can be used with media asset arrangements that are capable of accommodating slight errors or inconsistency. The media asset arrangement 200 is used to present photos for display on display screen 202. In this particular example, the media asset arrangement 200 positions photos 204-222 for display in a grid that is four columns across, as illustrated with dashed line boxes in FIG. 2. It is noted that the dashed line boxes are provided for explanatory purposes and are generally not visible to a user when photos are displayed. It should be understood that although the discussion herein is presented in the context of photos applications, the teachings provided are applicable to the presentation of any media asset or any collection of contents in a dataset.

In the example of FIG. 2, the display screen 202 displays a scroll bar 230 that is positioned at an edge of the user interface 200. The scroll bar 230 indicates that additional photos can be scrolled into view to be presented on display screen 202. In one example, the user interface 200 also displays a cursor 232. The cursor 232 can be moved using a pointing device, such as a mouse, to click and drag the scroll bar 230, thereby causing the display of photos to change. In other examples, the user interface 200 can be displayed on a touch-sensitive display of a portable multi-function device such as a mobile telephone, tablet computer, or smartphone. The touch-sensitive display is sometimes referred to as a "touch screen" for convenience. The touch screen has a touch-sensitive surface, including a sensor or sets of sensors that accept input from a user based on haptic and/or tactile contact. In other examples, rather than using a touch screen, a touchpad is included for controlling the user interface presented on display screen 202. The touchpad is a touch-sensitive area of a device that is separate from the display screen 202, and unlike the touch screen, does not display any visual output. The touch screen or the touchpad may detect contact (and any movement or breaking of the contact) and converts the detected contact into interaction with the user interface 200 or user interface objects (e.g., scroll bar 230) that are displayed on the touch screen. For example, the user can scroll through the photos 204-222 by applying a vertical swipe gesture.

It is further noted that although the example of FIG. 2 illustrates the grid as having four columns, the teachings of this present disclosure is not limited to any specific number of columns or rows. Alternative examples can have fewer or more columns within the grid. The grid contains as many rows as necessary to accommodate all photos in a photo library to be displayed. In this example, three rows 224, 226, and 228 are displayed on display screen 202. Each dashed line box (referred to as a "cell") can be conceptualized as a box or rectangle whose width is equal the width of a column.

The height of each cell is equal to the smaller of either the column width or the height of a tallest photo within each row. In this way, the column width is used to define the maximum dimensions possible for each cell. For example, row 226 is of a lesser height than rows 224 and 228. In an alternative example, all rows can have the same height. Photos are sized to fit and be centered within the cells allocated to them. Further, photos with wide aspect ratios can span across multiple columns. For example, photo 212 occupies the width of three columns.

The media asset arrangement 200 does not require exact aspect ratios for each photo in a photo library in order to position photos within the grid for display, and thus, does not require as much data to be transmitted relative to character or 32-bit float point encoding. In media asset arrangement 200, the vertical position of a photo depends only on the heights of the rows above it. The horizontal position and size of a photo depends only on the sizes of the photos adjacent to that photo in its row and does not depend on either photos following that photo or photos in other rows. It is noted that the aspect ratio of a photo describes the proportional relationship between its width and its height. Aspect ratios can be expressed as two numbers separated by a colon (e.g., 16:9). For any aspect ratio, no matter how large or small the photo is, if the width is divided into x units of equal length and the height is measured using this same length unit, the height will be measured to be y units, with the aspect ratio expressed as x:y, or in the alternative, as a single number representing x/y.

All photos in a portrait orientation have an aspect ratio that is less than one (e.g., x:y<1), with the height of photos in portrait orientations are greater than the widths. As previously discussed, the height of the cells within each row is equal to the smaller of either the column width or the height of a tallest photo within each row. Therefore, regardless of what the exact aspect ratio is for any particular portrait-oriented photo, it will be sized to fit within cells of media asset arrangement 200 based on the height of the cells within each row. Only a single aspect ratio value is needed to indicate that a photo is in portrait orientation.

For photos in a landscape orientation, photos are allocated one cell if their exact aspect ratios are between 1 and 2 (e.g., 1≤x:y<2); photos are allocated two cells if their exact aspect ratios are between 2 and 3 (e.g., 2≤x:y<3); and photos are allocated three cells if their exact aspect ratios are greater than 3 (e.g., x:y>3). Photos that span across either two or three columns have aspect ratios are wide enough such that the vertical height allocated to them is immaterial. Such photos having wide aspect ratios may be horizontally cropped to provide a reasonable displayed height on the screen. If the photos are not horizontally cropped and were only proportionally sized to fit in the cells allocated to them, the vertical height of wide photos can become so thin such that image details become hard to see clearly. In some examples, photos can be horizontally cropped such that the resulting cropped photos, when sized to fit for display in media asset arrangement 200, have a vertical height that occupies the height of the cells within its row. Therefore, regardless of what the exact aspect ratio is for any particular photo that is wide enough to span across multiple columns, only two aspect ratios values are needed to indicate that a photo is allocated either two cells (e.g., when the exact aspect ratio for that particular photo is between 2 and 3) or three cells (e.g., when the exact aspect ratio for that particular photo is greater than 3).

For photos having exact aspect ratios between 1 and 2 (e.g., 1≤x:y<2), approximated aspect ratios are assigned to photos based on the approximations that are closest to the exact aspect ratios. In one example, thirteen different approximations are provided for the aspect ratio range between 1 and 2. The approximations can include common aspect ratios such as 16:9, 3:2, and 4:3. Some other possible approximations include approximated aspect ratios of 5:4 or 16:10. The approximated aspect ratios allow photos to be displayed with minor changes to the fidelity of photos, resulting in a few pixels of imprecision in the resulting media asset arrangement 200. For example, consider a hypothetical photo that is 305 pixels wide and 201 pixels tall. If the closest approximated aspect ratio is 3:2, the hypothetical photo would be allocated one cell and displayed at a 3:2 aspect ratio within media asset arrangement 200. This can be accomplished by, for example, horizontally cropping the hypothetical photo by five pixels and vertically cropping the photo by 1 pixel, resulting in a 300×200 pixel photo to be displayed within media asset arrangement 200. In another example, a second hypothetical photo that is 299 pixels wide and 199 pixels tall could also be displayed at the approximated aspect ratio of 3:2 by adding a single pixel of white (or any other color) space to both the width and length of the photo, resulting in a 300×200 pixel photo to be displayed within media asset arrangement 200.

In a different example, pixels are not added or removed from photos. Rather, photos are scaled according to the closest approximated aspect ratio and displayed in a media asset arrangement as being centered within the cells allocated to the photos. For example, consider a hypothetical photo that is 308 pixels wide and 204 pixels tall. If the closest approximated aspect ratio is 3:2 and a media asset arrangement provides cell dimensions of 150×150 pixels, then the hypothetical photo is scaled to 154×102 pixels to approximately conform to the dimensions of the cell for which it is allocated. Centering the scaled photo within its cell leaves a 4-pixel-wide portion of the scaled photo that is outside of the cell. In other words, a 2-pixel-wide portion of the scaled photo extends beyond the boundaries of the cell. The cells are not visible to a user when photos are displayed and are used for positioning purposes. Thus, the user would likely not visually perceive that the spacing between photos is not identical.

Sixteen different values (e.g., the thirteen different approximations for exact aspect rations between 1 and 2, plus the aforementioned less than 1, between 2 and 3, and greater than 3 aspect ratios) need to be accounted for in an encoding scheme. Therefore, the approximated aspect ratios can be represented using four-bit (e.g., half a byte) data structures that provide approximated aspect ratio information in binary form. For example, a 4-bit sequence having the value 0000 can indicate that a photo has an exact aspect ratio less than 1, and should therefore in a portrait orientation. Similarly, a 4-bit sequence having the value 0001 can indicate that a photo has an exact aspect ratio that is greater than 3. By addressing the sixteen different values and approximated aspect ratios using 4-bits of data, only approximately 50 KB of data is required to represent the aspect ratios for the hypothetical library of one-hundred thousand photos. In some embodiments, the approximated aspect ratios can be encoded using additional or fewer bits. For example, a 3-bit binary encoding scheme can be used instead of the 4-bit encoding scheme described above. The 3-bit binary encoding scheme would provide for fewer approximated aspect ratio values but with the benefit of less data needing to be transmitted over a network. Alternatively, a 5-bit binary encoding scheme would provide for a greater number of approximated aspect ratio values (e.g., 32 possible unique binary combinations) at the expense of needing more data to be transmitted over a network.

Binary encoding and using approximated aspect ratios for positioning photos allows for improved data compression relative to other encoding schemes in exchange for a few pixels of imprecision in the resulting layout. By receiving the aspect ratio approximations as part of an encoded asset data stream with improved data compression, web applications are able to allow user scrolling of any part of a photo library into view.

Encoded Asset Data Stream

The response time for presenting photos (or any other media asset) in web applications is improved by using encoded asset data streams to generate a layout before the actual photo data or metadata is transferred from a server. In one example, a web application represents all photos in a photo library as a single stream of photos. The photos are numbered sequentially from zero up to, but not including, the total number of photos in the entire photo library. This represents each photo's index within the photo library. Further, each photo is associated with a unique identification number for use in the web application (referred to as a "clientID"). In one example, the clientID is an integer that can be up to 26-bits long (e.g., between 1 and $2^{26}-1/67,108,863$). In alternative embodiments, the clientID can be represented by a sequence of bits having a bit length shorter than 26. This clientID, together with the 4-bit approximated aspect ratio described above, forms a payload for an encoded asset data stream that describes all the photos in an entire photo library. For the purposes of this specification and the associated claims, the term "payload" is used to refer to the cargo (sometimes referred to as the body data) of an electronic data transmission. The payload is the portion of the data transmission that represents photo information, as opposed to other portions of the data transmission that are included solely to facilitate delivery (e.g., headers or metadata, sometimes referred to as the overhead data).

Figure 3:
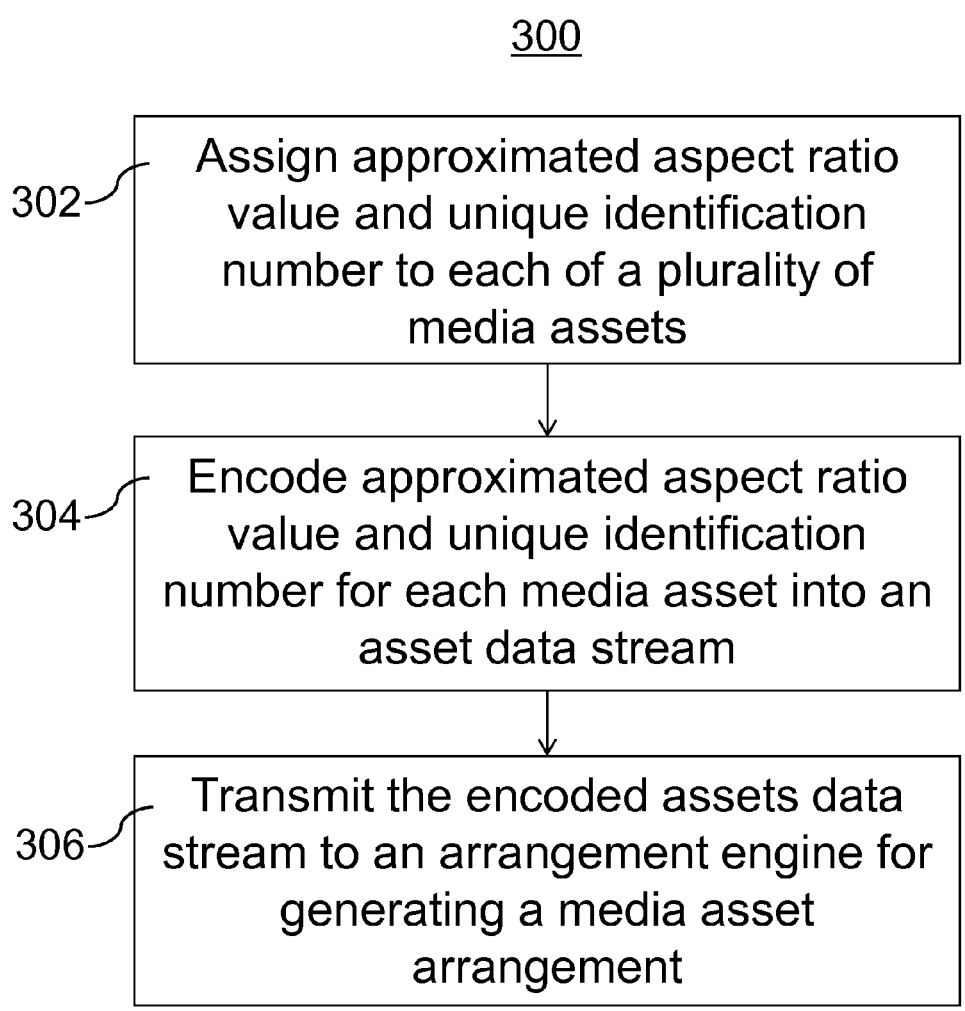
FIG. 3 is a flowchart illustrating a method for generating encoded asset data streams, according to an example embodiment.

FIG. 3 shows a method 300 according to one embodiment for generating encoded asset data streams. The method 300 can begin at operation 302 by assigning an approximated aspect ratio value and a unique identification number to each of a plurality of media assets. The method continues at operation 304 with encoding the approximated aspect ratio value and the unique identification number for each of the plurality of media assets into an encoded asset data stream. The approximated aspect ratio value for each of the plurality of media assets can be represented in a single byte (eight bits) of data, or less. The approximated aspect ratio value, represented as a 4-bit sequence of data, is assigned based on the approximations that are closest to the exact aspect ratios of each media asset. After encoding the encoded asset data stream, the method 300 continues at operation 306 by transmitting the encoded asset data stream to an arrangement engine that is configured to generate a media asset arrangement including a display position for each of the plurality of media assets described in the encoded asset data stream. For example, the encoded asset data stream can be used to generate a layout as previously illustrated and discussed in relation to the media asset arrangement 200 of FIG. 2.

In some example, the payload for the encoded asset data stream can be generated by concatenating the 4-bit approximated aspect ratio value and the 26-bit unique identification number together into a 30-bit binary sequence for each media asset. However, similar to the 32-bit floating point encoding previously discussed, 30-bit binary sequences still require a large amount of data per each media asset to be transmitted over a network. Thus, a custom payload encoding can be used to transmit data representing the 26-bit unique client identification and 4-bit approximated aspect ratio value using a lesser amount of data.

The custom payload encoding, in some embodiments, relates to a sequential numbering of media assets. For example, with sequential numbering, each new photo added to a photo library is assigned a new clientID. When a new photo is added to the photo library, it is assigned a clientID that is one integer higher than the clientID of the photo added before it. It is noted that clientID is unique to each photo and is not repeated within the same photo library. After a photo is removed from the photo library, the clientID associated with the removed photo is not assigned to any subsequently added photos. It is also noted that clientIDs are not re-assigned as photos are removed from the photo library. For example, consider a hypothetical photo library containing five photos. The five photos are assigned the clientIDs, 1, 2, 3, 4, and 5, respectively, based on the order in which they were added to the hypothetical photo library. If the photo associated with clientID 4 is removed from the hypothetical photo library, all other photos retain their own unique clientIDs. In particular, the photo associated with clientID 5 is not re-assigned a new clientID. Similarly, any additional photos added to the hypothetical will have clientIDs assigned starting at the value of 6, the value at which the previous numbering of clientIDs was stopped. Thus, value of a photo's clientID is assigned based on the clientID of the photo added before it. In this way, the clientIDs of the photos in photo libraries are generally in sequential order, except for gaps left by removed photos.

Due to the generally sequential ordering of photo libraries, a custom payload encoding for transmitting data representing the 26-bit unique identification number and 4-bit approximated aspect ratio value does not need to transmit the full 26-bit unique identification number/clientID for each photo. Rather, the custom payload encoding only needs to provide information representing the relative difference in clientIDs. In one embodiment, this relative difference information is provided using a 2-bit sequence that represent a number of additional bytes of data required to obtain a photo's clientID. If the 2-bit sequence has a value of '00', then a subsequent 2-bit sequence represents a difference between the clientID of the photo and the clientID of an immediately preceding photo's clientID, less one. Thus, clientID differences of 1, 2, 3, or 4 can be represented using the subsequent 2-bit sequence.

FIGS. 4A-C provide bit sequence examples of custom payload encoding for media assets. FIG. 4A illustrates a photo 402 having a hypothetical clientID of 100,000. The payload encoding begins with a 4-bit aspect ratio sequence 404 representing the approximated aspect ratio value assigned to photo 402. In the example, the 4-bit aspect ratio sequence 404 has a value of '0000'. The actual aspect ratio value to which this corresponds is not of significance and will not be further discussed here. After the 4-bit aspect ratio sequence 404, the payload encoding continues with a 4-bit additional bytes sequence 406 representing the number of additional bytes required to obtain the clientID of photo 402. In this example, the first two bits 408 of the additional bytes sequence 406 has a value of '10' (representing the decimal number '2' in binary form), indicating that two additional bytes of data are included in the payload encoding after the additional bytes sequence 406. Thus, after the additional bytes sequence 406, the payload encoding continues with two bytes of clientID data 410 that are combined with the second two bits 412 of the additional bytes sequence 406 to represent a full clientID of photo 402 in a total of eighteen bits. In this example, the full clientID has a value of '011000011010100000' (representing the decimal number '100,000' in binary form).

FIG. 4B illustrates a photo 414 having a hypothetical clientID of 100,001. The payload encoding for photo 414 begins with 4-bit aspect ratio sequence 404 representing the approximated aspect ratio value assigned to photo 414. In this example, the 4-bit aspect ratio sequence has a value of '0000'. After the 4-bit aspect ratio sequence 404, the payload encoding continues with a 4-bit additional bytes sequence 406 representing the number of additional bytes required to obtain the clientID of photo 414. In this example, the first two bits 408 of the additional bytes sequence 406 has a value of '00' (representing the decimal number '0' in binary form). This denotes that no additional byte sequences are provided to represent the full clientID of photo 414. When the first two bits 408 indicate that no additional byte sequences are provided, the second two bits 412 of the additional bytes sequence 406 represent a difference between the clientID of photo 414 and the clientID of the photo that immediately precedes it in the photo library (e.g., photo 402). In this example, the second two bits 412 has a value of '00' (representing the decimal number '0' in binary form), indicating that the clientID of photo 414 differs from photo 402 by one. Based on this differential, the clientID of photo 414 is 100,001.

FIG. 4C illustrates a photo 416 having a hypothetical clientID of 100,003. The payload encoding for photo 416 begins with 4-bit aspect ratio sequence 404 representing the approximated aspect ratio value assigned to photo 416. In this example, the 4-bit aspect ratio sequence has a value of '0000'. After the 4-bit aspect ratio sequence 404, the payload encoding continues with a 4-bit additional bytes sequence 406 representing the number of additional bytes required to obtain the clientID of photo 416. In this example, the first two bits 408 of the additional bytes sequence 406 has a value of '00' (representing the decimal number '0' in binary form). This denotes that no additional byte sequences are provided to represent the full clientID of photo 416. In this example, the second two bits 412 has a value of '01' (representing the decimal number '1' in binary form), indicating that the clientID of photo 416 differs from the clientID of the photo that immediately precedes it in the photo library (e.g., photo 416) by two. Based on this differential, the clientID of photo 416 is 100,003. It is noted that the clientID skips over 100,002 from FIG. 4B to FIG. 4C. This is due to a photo that was previously added to the photo library, assigned clientID 100,002, and then subsequently removed from the photo library.

In a fully sequential photo library that has experienced no deletes, the approximated aspect ratio value and clientID for each photo can be expressed with eight bits of data per photo using the payload encoding scheme described above and as illustrated in FIGS. 4B-4C. However, any gaps greater than four in the clientIDs between one photo to the next would require the approximated aspect ratio value and clientID for the next photo to be expressed using the payload encoding scheme described above and as illustrated in FIG. 4A to restate the entire clientID. Although the example of FIG. 4A indicates that two additional bytes of data are included in the payload encoding after the additional bytes sequence 406, it should be understood that the first two bits 408 of the additional bytes sequence 406 can also have values of '01' or '11' (representing the decimal numbers '1' and '3' in binary form). These alternative values in the first two bits 408 of the additional bytes sequence 406 indicates that one or three additional bytes of data are included in the payload encoding after the additional bytes sequence 406, which when combined with the second two bits 412 of the additional bytes sequence 406 result provide a full clientID having a length of 10- or 26-bits, respectively.

Thus, the payload for the encoded asset data stream can be generated by concatenating, for each one of a plurality of photos, a first series of bits representing a number of additional bytes required to obtain a photo's clientID and a second series of bits representing a difference between the photo's clientID and the clientID of a photo immediately preceding it in the photo library. It is noted that the payload for the encoded asset data stream also includes approximated aspect ratio values. The encoded asset data stream can be transmitted to an arrangement engine that is configured to generate a media asset arrangement including a display position for each of the plurality of photos without requiring the full clientID to be restated for each photo, thereby reducing the amount of data to be transmitted over a network.

Group Arrangement Data Stream

Client devices, such as previously discussed in reference to FIG. 2, includes software applications in the form of a web browser or a web application. The web application can include or utilize separate modules in its functionality, such as an arrangement engine. The arrangement engine processes encoded asset data streams to render and display photos by generating a media asset arrangement that includes a display position for all of the photos represented within an encoded asset data stream. The arrangement engine can be further configured to process group arrangement data streams for arranging the photos based upon different categorical groups.

Figure 5:
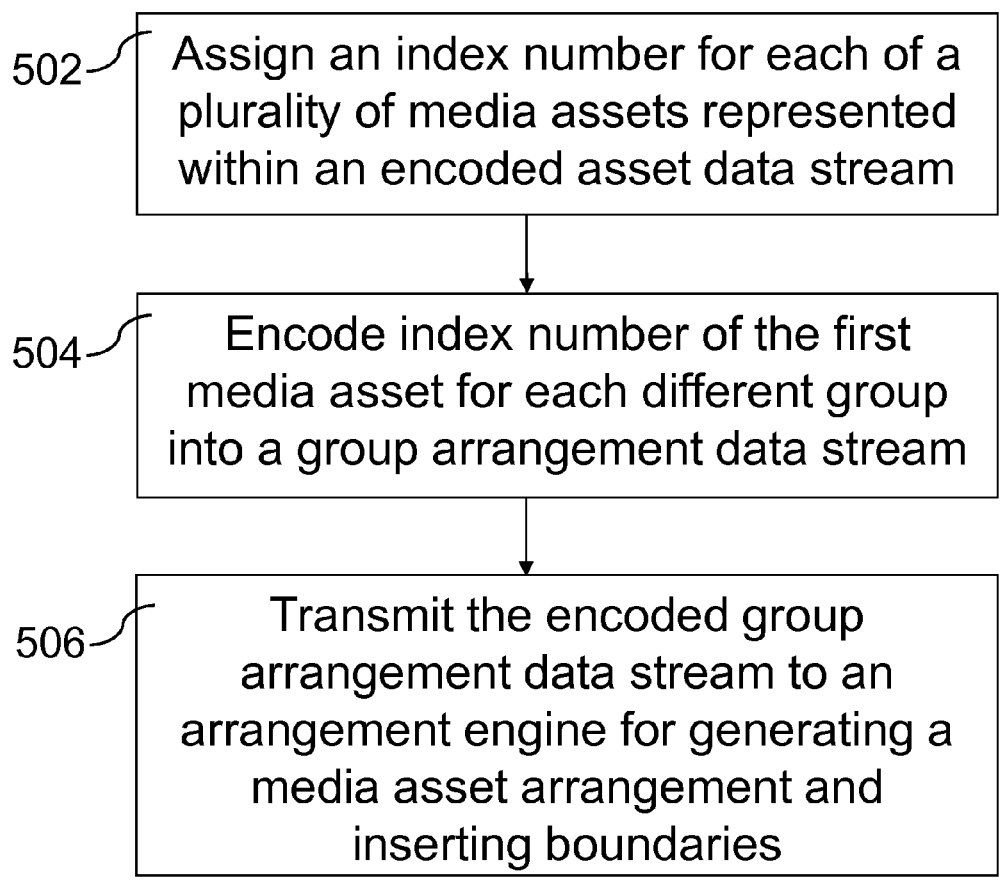
FIG. 5 is a flowchart illustrating a method for generating grouping arrangement data streams, according to an example embodiment.

FIG. 5 shows a method 500 according to one embodiment for generating group arrangement data streams. The method 500 can begin at operation 502 by determining an index number for each of the plurality of photos represented within an encoded asset data stream. The photos are numbered sequentially based on their ordering within the encoded asset data stream as a single stream of photos. Within the single stream of photos, the photos can be categorically organized into different groups, such as according to proximity in time, location, or subject. For example, the photos can be organized based on whether the photos are taken near one another in time, geographic location, or the individuals contained within the photos, or a combination of these or other factors. In addition to grouping based on temporal or spatial information, the photos can be categorized into different groups based on at least one of a caption, a rating, a keyword, a camera specification, and other metadata associated with the photos. The method 500 continues at operation 504 by encoding the index number of the first photo for each different group into an encoded group arrangement data stream. The group arrangement data stream, in one example, uses a 24-bit payload encoding scheme. After encoding the group arrangement data stream, the method 500 continues at operation 506 by transmitting the encoded group arrangement data stream to an arrangement engine that is configured to insert a boundary between photos in a media asset arrangement based upon the different groupings.

Though arranged serially in the example of FIGS. 3 and 5, other examples may reorder the operations, omit one or more operations, and/or execute two or more operations in parallel using multiple processors or a single processor organized as two or more virtual machines or sub-processors. Moreover, still other examples can implement the operations as one or more specific interconnected hardware or integrated circuit modules with related control and data signals communicated between and through the modules. Thus, any process flow is applicable to software, firmware, hardware, and hybrid implementations.

Figure 6:
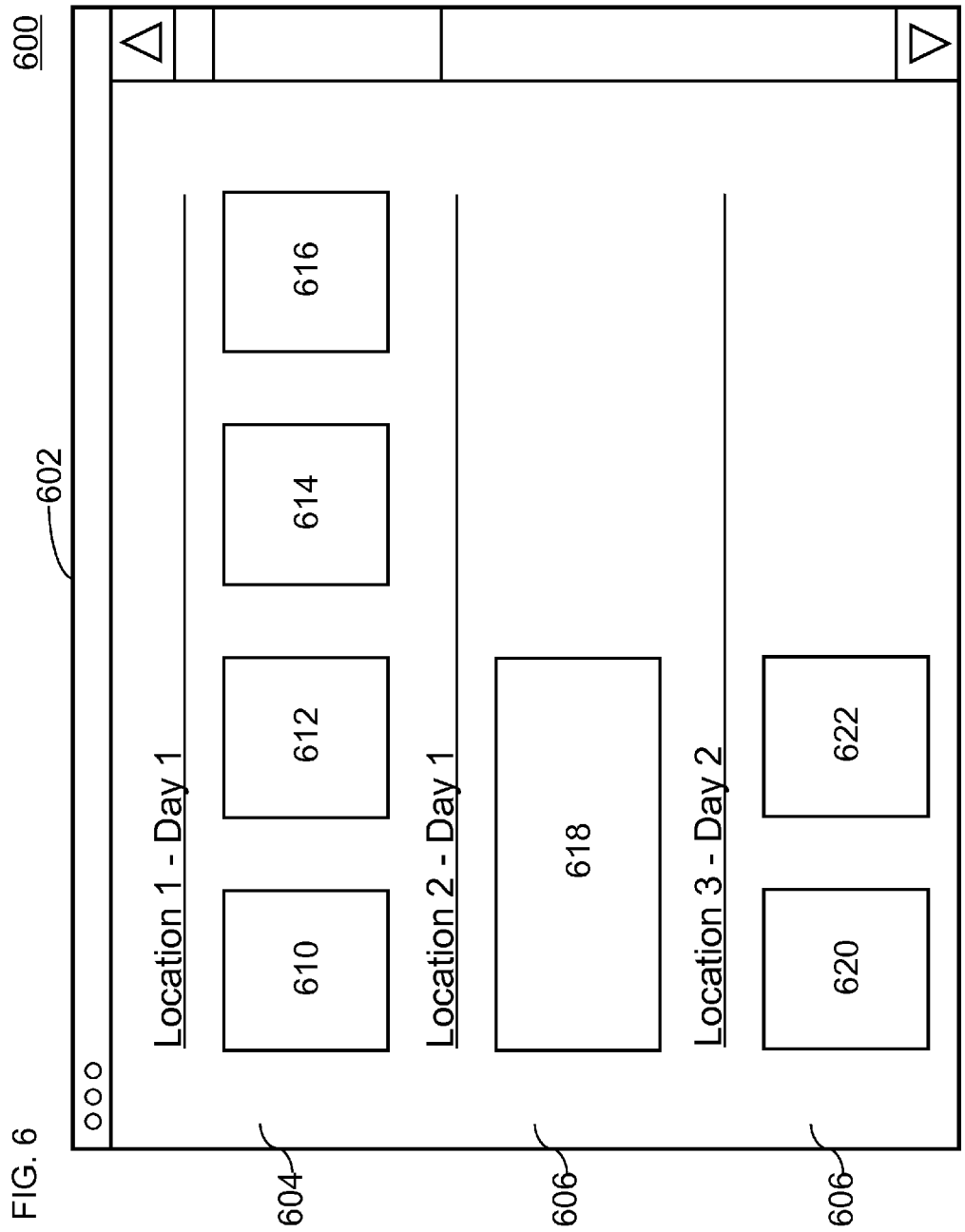
FIG. 6 illustrates an example graphical user interface that appears on a screen of a client device for presenting photos using a media asset arrangement that is generated based on asset data streams and grouping arrangement data streams.

FIG. 6 illustrates an example graphical user interface that appears on a display of a client device for presenting photos using a media asset arrangement 600 that is generated based on encoded asset data streams and encoded group arrangement data streams. After receiving the encoded asset data stream and encoded group arrangement data stream at an arrangement engine, the media asset arrangement 600 is generated to present photos for display in a web application 602. In this particular example, the media asset arrangement 600 positions photos for display according to time interval groupings. Specifically, each grouping 604, 606, and 608 (referred to as "Moments" in this example) displays photos taken near one another in time, and also based on geographic location. In this example, photos 610-616 are arranged in media asset arrangement 600 according to their approximated aspect ratios as provided in the received encoded asset data stream and organized into a first grouping 604 according to the received encoded group arrangement data stream. Photo 618 is arranged in media asset arrangement 600 as being allocated two columns as provided in the received encoded asset data stream and organized into a second grouping 606 according to the received encoded group arrangement data stream. The first grouping 604 and the second 606 were taken on the same day (e.g., near one other in time), but are separated based upon the different locations at which the photos were taken. Photos 620 and 622 are arranged in media asset arrangement 600 according to their approximated aspect ratios as provided in the received encoded asset data stream and organized into a third grouping 606 according to the received encoded group arrangement data stream. The third grouping 606 is separated from groupings 604 and 606 based upon the different time intervals (e.g., different days) at which the photos were taken. In general, both the assets and encoded group arrangement data streams are used by the arrangement engine to arrange photos according to their approximated aspect ratios, while separating them across grouping boundaries.

It is noted that photo information for all of the photos in a photo library is not needed to generate media asset arrangement 600 for display. Rather, the encoded asset data stream and encoded group arrangement data stream, along with the photo information for photos that will be displayed first (e.g., photos 610-622), provide enough information to position photos for display in media asset arrangement 600. The web application requests additional photo information as a user switches views to different groupings or scrolls through the photo library. This allows the web application to quickly present photos for display without having to wait on transmittal of photo information for all of the photos in a photo library, thereby increasing performance and allows a fast population of photos in a web application/web browser.

Modules, Components and Logic

Certain embodiments are described herein as including logic or a number of components, modules, or mechanisms, such as the arrangement engine. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include client devices and servers. A client device and server are generally remote from each other and typically interact through a communication network. The relationship of client devices and servers arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 7:
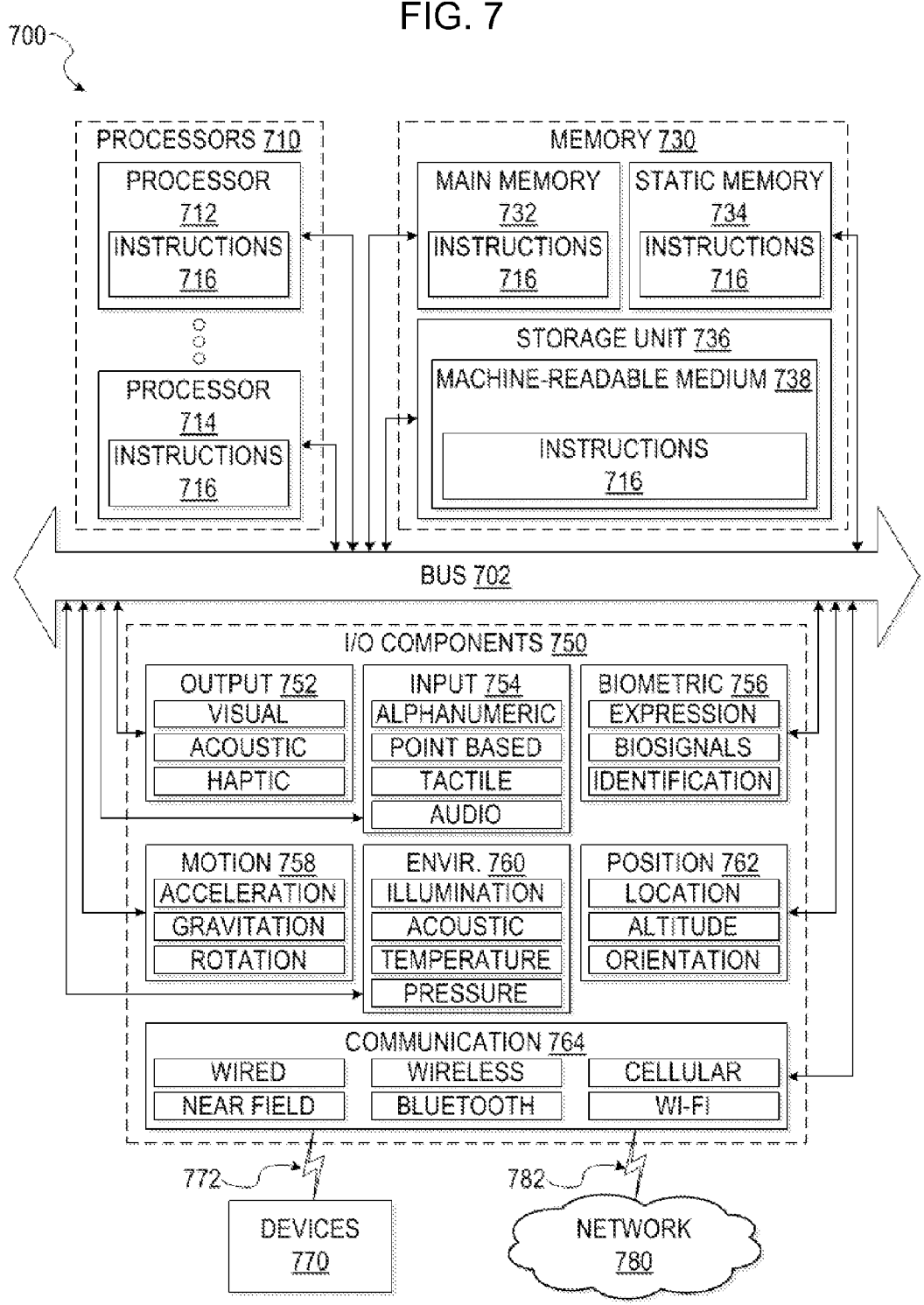
FIG. 7 is a diagrammatic representation of a machine in the example form of a client device within which a set of instructions for causing the machine to perform any one or more of the methodologies discussed herein may be executed.

FIG. 7 is a block diagram illustrating components of a machine in the example form of a client device 700, according to some example embodiments, able to read instructions from a machine-readable medium (e.g., a machine-readable storage medium) and perform any one or more of the methodologies discussed herein. Specifically, FIG. 7 shows a diagrammatic representation of the client device 700 in the example form of a computer system, within which instructions 716 (e.g., software, a program, an application, an applet, an app, or other executable code) for causing the client device 700 to perform any one or more of the methodologies discussed herein may be executed. In alternative embodiments, the client device 700 operates as a standalone device or may be coupled (e.g., networked) to other machines. In a networked deployment, the client device 700 may operate in the capacity of a server machine or a client machine in a server-client network environment, or as a peer machine in a peer-to-peer (or distributed) network environment. The client device 700 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by client device 700. Further, while only a single client device 700 is illustrated, the term "client device" shall also be taken to include a collection of client devices 700 that individually or jointly execute the instructions 716 to perform any one or more of the methodologies discussed herein.

The client device 700 may include processors 710, memory 730, and input/output (I/O) components 750, which may be configured to communicate with each other via a bus 702. In an example embodiment, the processors 710 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 712 and processor 714 that may execute instructions 716. The term "processor" is intended to include multi-core processors that may comprise two or more independent processors (also referred to as "cores") that may execute instructions contemporaneously. Although FIG. 7 shows multiple processors, the client device 700 may include a single processor with a single core, a single processor with multiple cores (e.g., a multi-core process), multiple processors with a single core, multiple processors with multiples cores, or any combination thereof.

The memory 730 may include a main memory 732, a static memory 734, and a storage unit 736 accessible to the processors 710 via the bus 702. The storage unit 736 may include a machine-readable medium 738 on which is stored the instructions 716 embodying any one or more of the methodologies or functions described herein. The instructions 716 may also reside, completely or at least partially, within the main memory 732, within the static memory 734, within at least one of the processors 710 (e.g., within the processor's cache memory), or any suitable combination thereof, during execution thereof by the client device 700. Accordingly, in various implementations, the main memory 732, static memory 734, and the processors 710 are considered as machine-readable media 738.

As used herein, the term "memory" refers to a machine-readable medium 738 able to store data temporarily or permanently and may be taken to include, but not be limited to, random-access memory (RAM), read-only memory (ROM), buffer memory, flash memory, and cache memory. While the machine-readable medium 738 is shown in an example embodiment to be a single medium, the term "machine-readable medium" should be taken to include a single medium or multiple media (e.g., a centralized or distributed database, or associated caches and servers) able to store instructions 716. The term "machine-readable medium" shall also be taken to include any medium, or combination of multiple media, that is capable of storing instructions (e.g., instructions 716) for execution by a machine (e.g., client device 700), such that the instructions, when executed by one or more processors of the client device 700 (e.g., processors 710), cause the client device 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 750 include a wide variety of components to receive input, provide output, produce output, transmit information, exchange information, capture measurements, and so on. In general, it will be appreciated that the I/O components 750 may include many other components that are not shown in FIG. 7. The I/O components 750 are grouped according to functionality merely for simplifying the following discussion and the grouping is in no way limiting. In various example embodiments, the I/O components 750 include output components 752 and input components 754. The output components 752 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 754 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and force of touches or touch gestures, or other tactile input components), audio input components (e.g., a microphone), and the like.

In some further example embodiments, the I/O components 750 include biometric components 756, motion components 758, environmental components 760, or position components 762 among a wide array of other components. For example, the biometric components 756 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 758 include acceleration sensor components (e.g., accelerometer), gravitation sensor components, rotation sensor components (e.g., gyroscope), and so forth. The environmental components 760 include, for example, illumination sensor components (e.g., photometer), acoustic sensor components (e.g., one or more microphones that detect background noise), temperature sensor components (e.g., one or more thermometer that detect ambient temperature), pressure sensor components (e.g., barometer), humidity sensor components, proximity sensor components (e.g., infrared sensors that detect nearby objects), gas sensors (e.g., machine olfaction detection sensors, gas detection sensors to detection concentrations of hazardous gases for safety or to measure pollutants in the atmosphere), or other components that may provide indications, measurements, or signals corresponding to a surrounding physical environment. The position components 762 include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 750 may include communication components 764 operable to couple the client device 700 to a network 780 or devices 770 via coupling 782 and coupling 772, respectively. For example, the communication components 764 include a network interface component or another suitable device to interface with the network 780. In further examples, communication components 764 include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 770 may be another machine or any of a wide variety of peripheral devices (e.g., a peripheral device coupled via a Universal Serial Bus (USB)).

Moreover, in some implementations, the communication components 764 detect identifiers or include components operable to detect identifiers. For example, the communication components 764 include Radio Frequency Identification (RFID) tag reader components, NFC smart tag detection components, optical reader components (e.g., an optical sensor to detect a one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, Uniform Commercial Code Reduced Space Symbology (UCC RSS)-2D bar code, and other optical codes), acoustic detection components (e.g., microphones to identify tagged audio signals), or any suitable combination thereof. In addition, a variety of information can be derived via the communication components 764, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 780 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 780 or a portion of the network 780 may include a wireless or cellular network and the coupling 782 may be a Code Division Multiple Access (CDMA) connection, a Global System for Mobile communications (GSM) connection, or other type of cellular or wireless coupling. In this example, the coupling 782 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

In example embodiments, the instructions 716 are transmitted or received over the network 780 using a transmission medium via a network interface device (e.g., a network interface component included in the communication components 764) and utilizing any one of a number of well-known transfer protocols (e.g., HTTP). Similarly, in other example embodiments, the instructions 716 are transmitted or received using a transmission medium via the coupling 772 (e.g., a peer-to-peer coupling) to devices 770. The term "transmission medium" shall be taken to include any intangible medium that is capable of storing, encoding, or carrying instructions 716 for execution by the client device 700, and includes digital or analog communications signals or other intangible medium to facilitate communication of such software.

Furthermore, the machine-readable medium 738 is non-transitory (in other words, not having any transitory signals) in that it does not embody a propagating signal. However, labeling the machine-readable medium 738 as "non-transitory" should not be construed to mean that the medium is incapable of movement; the medium should be considered as being transportable from one physical location to another. Additionally, since the machine-readable medium 738 is tangible, the medium may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled. As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer-implemented method for displaying media assets, comprising executing on a processor the steps of:
   receiving, at an electronic device, an electronic communication containing an encoded asset data stream, the encoded asset data stream including, for each media asset of a plurality of media assets, an approximated aspect ratio value and a unique identification number encoded in a predetermined number of bits of data, wherein the encoded asset data stream includes concatenating, for each one of the plurality of media assets, a first bit portion representing a number of additional bytes required to obtain a first media asset's unique identification number and a second bit portion representing a difference between the first media asset's unique identification number and a second media asset's unique identification number;

generating, using the encoded asset data stream, a media asset arrangement that includes a display position for at least a first subset of the plurality of media assets; and displaying the first subset of the plurality of media assets in the media asset arrangement.

2. The computer-implemented method of claim 1, further comprising:

receiving, at the electronic device, an encoded group arrangement data stream providing an index number of a first media asset for each different group corresponding to the plurality of media assets; and displaying a boundary between each different group of the plurality of media assets.

3. The computer-implemented method of claim 1, wherein at least the first subset of the plurality of media assets are sized to fit in the display position allocated to each media asset within the first subset of media assets included in the media asset arrangement.

4. The computer-implemented method of claim 3, wherein each media asset of the plurality of media assets are sized to fit by adding or removing pixels from a scaled thumbnail of each media asset.

5. The computer-implemented method of claim 1, wherein the media asset arrangement is arranged as a grid of columns and rows, further wherein a vertical position of one of the plurality of media assets in the media asset arrangement is based on a combined height of all rows positioned above that one of the plurality of media assets.

6. The computer-implemented method of claim 1, wherein a horizontal position along a row of media assets in the media asset arrangement is based on a combined size of all media assets positioned to the left of a media asset at the horizontal position in the row of media assets.

7. A method, comprising executing on a processor the steps of:

assigning an approximated aspect ratio value and a unique identification number to each media asset of a plurality of media assets;

encoding the approximated aspect ratio value and the unique identification number for each of the plurality of media assets into an asset data stream value, including representing the approximated aspect ratio value and the unique identification number for each of the plurality of media assets in a predetermined number of bits within an encoded asset data stream, wherein encoding the encoded asset data stream includes concatenating, for each one of the plurality of media assets, a first bit portion representing a number of additional bytes required to obtain a first media asset's unique identification number and a second bit portion representing a difference between the first media asset's unique identification number and a second media asset's unique identification number;

receiving a request to display the plurality of media assets; and transmitting, in response to the request, the encoded asset data stream to an arrangement engine, the arrangement engine configured to generate a media asset arrangement including a display position for each of the plurality of media assets based at least in part on the encoded asset data stream.

8. The method of claim 7, further comprising:

assigning a sequential index number for each of the plurality of media assets based at least in part on their ordering within the encoded asset data stream;

categorizing the plurality of media assets into a plurality of different groups;

determining a first media asset for each different group; and encoding a group arrangement data stream, wherein the group arrangement data stream provides at least the sequential index number of the first media asset for each different group.

9. The method of claim 8, further comprising:

transmitting the group arrangement data stream to the arrangement engine, wherein the arrangement engine is further configured to insert a boundary between each different grouping of the plurality of media assets based on the groupings feed.

10. The method of claim 8, wherein the plurality of media assets are categorized into the plurality of different groups based on at least one of a temporal information, a spatial information, a caption, a rating, a keyword, a camera specification, and other metadata associated with the plurality of media assets.

11. A non-transitory computer-readable medium, comprising instructions stored thereon, that when executed on a processor, perform the operations of:

assigning an approximated aspect ratio value and a unique identification number to each media asset of a plurality of media assets;

encoding the approximated aspect ratio value and the unique identification number for each of the plurality of media assets into an asset data stream, including representing the approximated aspect ratio value and the unique identification number for each of the plurality of media assets in a predetermined number of bits within an encoded asset data stream;

concatenating, for each one of the plurality of media assets, a first data portion representing a number of additional bytes required to obtain a first media asset's unique identification number and a second data portion representing a difference between the first media asset's unique identification number and a second media asset's unique identification number;

receiving a request to display the plurality of media assets; and transmitting, in response to the request, the encoded asset data stream to an arrangement engine, the arrangement engine configured to generate a media asset arrangement including a display position for each of the plurality of media assets based at least in part on the encoded asset data stream.

12. The non-transitory computer-readable medium of claim 11, further comprising instructions for performing the operations of:

assigning a sequential index number for each of the plurality of media assets based at least in part on their ordering within the encoded asset data stream;

categorizing the plurality of media assets into a plurality of different groups;

determining a first media asset for each different group; and encoding a group arrangement data stream, wherein the group arrangement data stream provides at least the sequential index number of the first media asset for each different group.

13. The non-transitory computer-readable medium of claim 12, further comprising instructions for performing the operations of:

transmitting the group arrangement data stream to the arrangement engine, wherein the arrangement engine is further configured to insert a boundary between each different group of the plurality of media assets, based on the group arrangement data stream.

14. The non-transitory computer-readable medium of claim 12, wherein the plurality of media assets are categorized into different groupings based on at least one of a temporal information, a spatial information, a caption, a rating, a keyword, a camera specification, and other metadata associated with the plurality of media assets.

15. A non-transitory computer-readable medium, comprising instructions stored thereon, that when executed on a processor, perform the operations of:
receiving, at an electronic device, an electronic communication containing an encoded asset data stream, the encoded asset data stream including, for each media asset of a plurality of media assets, an approximated aspect ratio value and a unique identification number encoded in a predetermined number of bits of data, wherein the encoded asset data stream includes concatenating, for each one of the plurality of media assets, a first bit portion representing a number of additional bytes required to obtain a first media asset's unique identification number and a second bit portion representing a difference between the first media asset's unique identification number and a second media asset's unique identification number;
generating, using the encoded asset data stream, a media asset arrangement that includes a display position for at least a first subset of the plurality of media assets; and
displaying the first subset of the plurality of media assets in the media asset arrangement.

16. The non-transitory computer-readable medium of claim 15, wherein at least the first subset of the plurality of media assets are sized to fit in the display position allocated to each media asset within the first subset of media assets included in the media asset arrangement.

17. The non-transitory computer-readable medium of claim 16, wherein each media asset of the plurality of media assets are sized to fit by adding or removing pixels from a scaled thumbnail of each media asset.

18. The non-transitory computer-readable medium of claim 15, wherein the media asset arrangement is arranged as a grid of columns and rows, further wherein a vertical position of one of the plurality of media assets in the media asset arrangement is based on a combined height of all rows positioned above that one of the plurality of media assets.

19. The non-transitory computer-readable medium of claim 15, wherein a horizontal position along a row of media assets in the media asset arrangement is based on a combined size of all media assets positioned to the left of a media asset at the horizontal position in the row of media assets.

20. A system comprising:
at least one processor; and
a computer-readable medium storing one or more sequences of instructions which, when executed by the at least one processor, causes:
receiving, at an electronic device, an electronic communication containing an encoded asset data stream, the encoded asset data stream including, for each media asset of a plurality of media assets, an approximated aspect ratio value and a unique identification number encoded in a predetermined number of bits of data, wherein the encoded asset data stream includes concatenating, for each one of the plurality of media assets, a first bit portion representing a number of additional bytes required to obtain a first media asset's unique identification number and a second bit portion representing a difference between the first media asset's unique identification number and a second media asset's unique identification number;
generating, using the encoded asset data stream, a media asset arrangement that includes a display position for at least a first subset of the plurality of media assets; and
displaying the first subset of the plurality of media assets in the media asset arrangement.

\* \* \* \* \*

UNITED STATES PATENT AND TRADEMARK OFFICE
CERTIFICATE OF CORRECTION

PATENT NO. : 9,830,047 B2
APPLICATION NO. : 14/656048
DATED : November 28, 2017
INVENTOR(S) : Brian E. Kirsch et al.

It is certified that error appears in the above-identified patent and that said Letters Patent is hereby corrected as shown below:

On the Title Page

Item (73) replace Assignee "APPLE" with --Apple Inc.--

Signed and Sealed this
Second Day of January, 2018

Joseph Matal
*Performing the Functions and Duties of the*
*Under Secretary of Commerce for Intellectual Property and*
*Director of the United States Patent and Trademark Office*